(12) United States Patent
Ohashi et al.

(10) Patent No.: US 6,319,334 B1
(45) Date of Patent: Nov. 20, 2001

(54) RARE EARTH/IRON/BORON-BASED PERMANENT MAGNET AND METHOD FOR THE PREPARATION THEREOF

(75) Inventors: Ken Ohashi; Tadao Nomura, both of Fukui-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/461,746

(22) Filed: Dec. 16, 1999

(30) Foreign Application Priority Data

Dec. 17, 1998 (JP) .................................. 10-358573

(51) Int. Cl.[7] ................................................. H01F 1/055
(52) U.S. Cl. ........................ 148/101; 148/120; 148/121
(58) Field of Search .................................. 148/100, 101, 148/120, 121; 419/12; 425/79

(56) References Cited

U.S. PATENT DOCUMENTS 4,135,953 * 1/1979 Nagel et al. .
5,011,823 * 4/1991 Jin et al. .
5,356,868 * 10/1994 Naito et al. .

FOREIGN PATENT DOCUMENTS 0 860 838    8/1998 (EP) .
0860838-A1 * 8/1998 (EP) .
63076805-A * 4/1988 (JP) .
06228608-A * 8/1994 (JP) .

OTHER PUBLICATIONS

Patent Abstracts of Japan, 014(139) (E–0903), abstract of JP 2–003201 (Mar. 1990).
W. Chang et al., *Appl. Phys. Lett.*, 72(1), 121–123 (Jan. 1998).
W. Chang et al., *Journal of Magnetism and Magnetic Materials*, 109(1), 103–108 (Feb. 1992).

* cited by examiner

Primary Examiner—Roy King
Assistant Examiner—Harry D. Wilkins, III
(74) Attorney, Agent, or Firm—Wenderoth, Lind & Ponack, LLP

(57) ABSTRACT

Disclosed is a method for the preparation of a magnetically anisotropic rare earth/iron/boron-based permanent magnet in a relatively bulky form having a nanocomposite structure as prepared from quenched thin ribbons of the alloy. The method comprises heating the powder of quenched thin ribbons to a temperature allowing partial formation of a liquid phase of a lanthanum/iron or rare earth/copper alloy of low melting point and subjecting the powder of the quenched thin ribbons to a uniaxial hot-deformation treatment by passing the powder under resistance heating through a gap between a pair of compression rollers.

7 Claims, 1 Drawing Sheet

RARE EARTH/IRON/BORON-BASED PERMANENT MAGNET AND METHOD FOR THE PREPARATION THEREOF

BACKGROUND OF THE INVENTION

The present invention relates to a novel rare earth/iron/boron-based permanent magnet and a method for the preparation thereof. More particularly, the invention relates to a rare earth/iron/boron-based permanent magnet having magnetic anisotropy and suitable for use in the actuator for head driving of computer hard disk drives and a method for the preparation thereof.

Since the debut of neodymium/iron/boron-based permanent magnets proposed by Sagawa et al. and by Croat et al., of which the principal phase is $Nd_2Fe_{14}B$ compound, the rare earth-based permanent magnets of this type have acquired very remarkable improvements in the magnetic properties as a consequence of the extensive development works relative to optimization of the base composition and additive elements as well as to the improvement of the preparation method by which high magnetic properties of the permanent magnets can be derived for the respective magnet alloy compositions.

Various proposals and attempts have been made heretofore in the powder metallurgical process, which is the most widely employed for the preparation of neodymium/iron/boron-based sintered permanent magnets, referred to as the Nd/Fe/B-based magnets hereinafter, directed toward a lower and lower content of neodymium and higher and higher content of iron approaching the stoichiometric composition of the $Nd_2Fe_{14}B$ compound which consists of 11.8% by moles of neodymium, 82.3% by moles of iron and 5.9% by moles of boron, toward a lower and lower degree of oxidation of the magnet alloy, toward high and higher magnetic orientation of the magnet alloy grains by under-taking the compression molding in an increased magnetic field, toward finer and finer metallographic structures and so on. As a result of these improvements applied in combination, a maximum energy product (BH)max of the permanent magnets of this type now has reached a level as high as about 88% of the theoretically possible highest value.

It is, however, the generally accepted impression that improvements of the magnetic properties of the permanent magnets of this type by the modification of the powder metallurgical process or the composition of the magnet alloy for the preparation thereof will sooner or later come at an insurmountable limit. For example, the powder metallurgical process is not suitable for the preparation of a high-performance Nd/Fe/B-based magnet of which the content of iron exceeds the theoretical value 82.3% by moles for the $Nd_2Fe_{14}B$ compound. This is because a high content of iron in the magnet alloy necessarily leads to the formation of the magnetically soft Fe phase which causes reversal of magnetization adversely influencing on the coercive force of the magnet. It is also presumable that a metallographic phase of low melting point of which the content of neodymium is higher than the stoichiometric content with consequent deficiency in the content of iron in the alloy composition forms a molten liquid phase which serves to the occurrence of the coercive force of the type of the nuclei incipience and growth by cleaning the surface of the $Nd_2Fe_{14}B$ grains.

An alternative method to the powder metallurgical method is known for the preparation of a Nd/Fe/B-based permanent magnet having magnetic anisotropy, which is the so-called uniaxial hot-deformation method. In this method, a quenched thin ribbon of Nd/Fe/B-based microcrystals obtained from an amorphous thin ribbon by a heat treatment or quenching at a controlled cooling rate, which is available as a commercial product (MQ1, a product by MQI Co.) is hot-pressed into a magnetically isotropic bulky magnet (MQ2, a product by MQI Co.) which is subjected to a uniaxial hot-deformation treatment by pressing so that the magnetic grains are oriented to align their easy magnetization axes in the direction of pressing to give a magnetically anisotropic Nd/Fe/B-based permanent magnet available as a commercial product (MQ3, a product by MQI Co.).

Needless to say, the degree of magnetic orientation in the above obtained magnetically anisotropic permanent magnet positively depend on the extent of the uniaxial hot-deformation. In this regard, the method of uniaxial hot-deformation thus far developed is successful to accomplish a large maximum energy product (BH)max of the magnet which is as large as about 75% of the theoretically possible largest value.

The above described method of uniaxial hot-deformation, however, has a problem that the composition of the magnet alloy to which the method is applicable is limited because deformation by uniaxial hot-pressing can proceed only in a magnet alloy which permits existence of a liquid phase at the temperature of hot-pressing. Namely, the method is not applicable to a magnet alloy having a chemical composition not to allow formation of a phase of low melting point or of a higher content of iron. These situations have led to a general understanding that the uniaxial hot-deformation method is not suitable when the Nd/Fe/B-based permanent magnet is desired to have magnetic properties superior to those of a magnet prepared by the powder metallurgical method.

On the other hand, so-called nanocomposite permanent magnets are highlighted in recent years in respect of the possibility of accomplishing a great improvement in the magnetic properties of permanent magnets. Namely, a nanocomposite permanent magnet is an integral body having a composite structure made from a magnetically soft phase and a magnetically hard phase integrally intermixed with fineness of 10 nm order and coupled by magnetic exchange coupling. As is evidenced by a simulating calculation and by experiments, a nanocomposite permanent magnet exhibits excellent magnetic properties despite the presence of a magnetically soft phase. Accordingly, it would be within possibility to obtain a nanocomposite permanent magnet consisting of magnetically soft and hard phases and having a high saturation magnetization and a high coercive force, of which the magnetic properties may exceed those of the magnetically hard phase per se, by using base materials having a high saturation magnetization for the magnetically soft phase.

As is known, a rare earth-based nanocomposite permanent magnet can be formed from a combination of a magnetically soft phase including the phases of Fe, FeCo, FeB/FeN-based compounds and the like and a magnetically hard phase including the phases of $Nd_2Fe_{14}B$, $SmCo_5$, $Sm_2Co_{17}$, $Sm_2Fe_{17}N_x$, $NdTiFe_{11}N_x$ and other nitrides. It is noted here that the combination of the magnetically soft and hard phases is not limited to one or several of specific combinations but can be any of combinations of the magnetically soft and hard compounds freely selected from the above given species for each of the respective phases. The composition of the magnetically hard phase is not always a limiting factor to the combinations.

While the magnetic exchange coupling between the magnetically soft and hard phase in a nanocomposite magnet can be effective only when the magnetic grains of the phases have a 10 nm order fineness, no successful results have yet been obtained for imparting magnetic anisotropy to a nanocomposite magnet of such an extreme fineness of the structure.

While the feature of nanocomposite permanent magnets consists in a relatively high residual magnetic flux density Br accomplished by the presence of a magnetically soft phase even when the magnet has a magnetically isotropic structure, the coercive force and the maximum energy product of a nanocomposite permanent magnet cannot be high enough when the magnet has a magnetically isotropic structure.

A serious problem in nanocomposite permanent magnets is that a nanocomposite magnet of a bulky form can hardly be prepared. Namely, nanocomposite magnets are prepared usually by the method of melt-quenching or mechanical alloying and obtained in the form of a powder or in the form of a thin ribbon and no practical method has yet been developed for converting such a powder or thin ribbon into a bulky form of the magnet without coarsening of the nanocomposite structure. The only method by utilizing a pulsed ultrahigh pressure for conversion of a powder of a nanocomposite magnet into a bulky form is very specific and expensive and far from the possibility of practical use.

As is discussed above, nanocomposite permanent magnets cannot be under the way of development unless a method is established both for imparting magnetic anisotropy and for preparing a bulky form of the magnet simultaneously.

SUMMARY OF THE INVENTION

The present invention accordingly has an object to provide a novel method for the preparation of a R/Fe/B-based permanent magnet in a bulky form having a magnetically anisotropic nanocomposite structure, of which the magnetically hard phase is the $R_2Fe_{14}B$ phase, R being a rare earth element or a combination of rare earth elements.

Thus, the present invention provides a method for the preparation of a R/Fe/B-based permanent magnet having a nanocomposite structure, of which the molar content of iron is at least 82%, the magnetically hard phase is a $R_2Fe_{14}B$ phase and the magnetically soft phase is Fe phase or $Fe_3b$ phase, R being a rare earth element or a combination of rare earth elements, which comprises the step of subjecting a quenched thin ribbon of a R/Fe/B-based magnetic alloy to a uniaxial hot-deformation treatment at a temperature to allow presence of a molten liquid phase of an alloy so as to obtain a magnetically anisotropic permanent magnet body.

Further, the above defined method of the invention is applicable to the preparation of a R/Fe/Co/B-based permanent magnet having a nanocomposite structure, of which the total molar content of iron and cobalt is at least 82%, the molar proportion of the amount of cobalt is not exceeding 20% of the total amount of iron and cobalt. The magnetically hard phase is a $R_2Fe_{14}B$ phase and the magnetically soft phase is Fe phase or $Fe_3b$ phase, R being a rare earth element or a combination of rare earth elements.

DETAILED DESCRIPTION OF THE PREFERRED EMBODIMENTS

Figure 1:
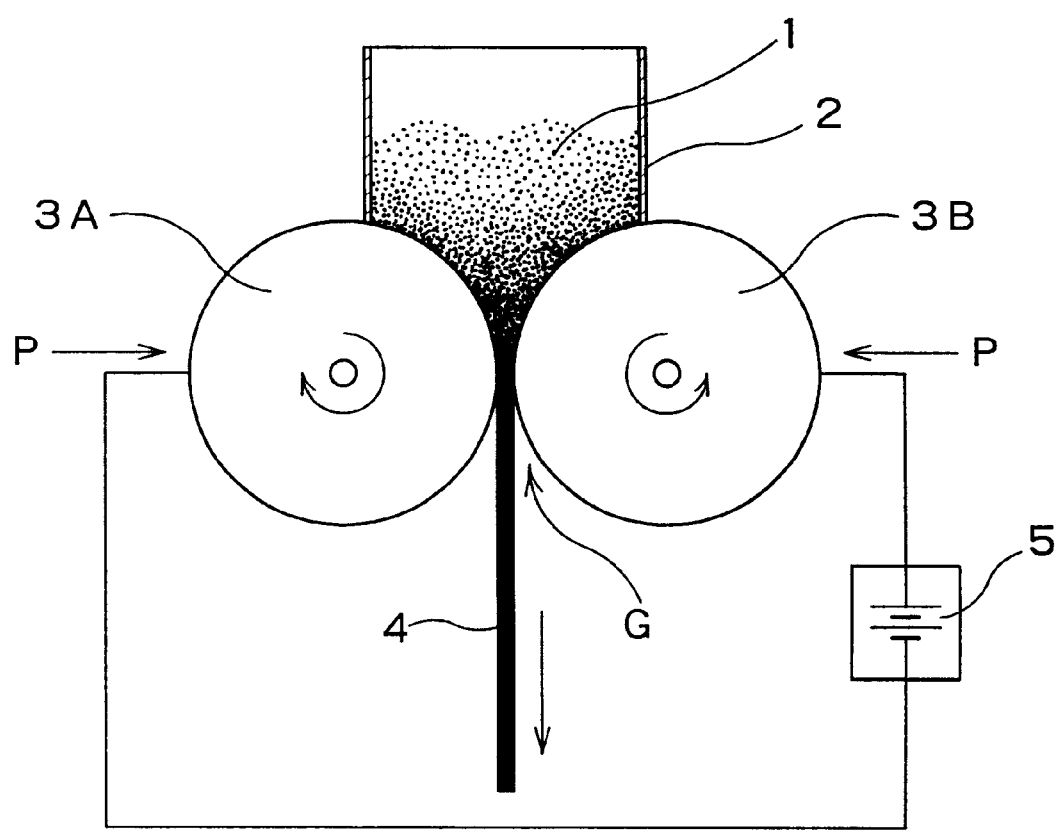
FIG. 1 is a schematic cross sectional drawing illustrating the principle of the current-carrying powder rolling method for the preparation of a bulky permanent magnet of the invention.

As is understood from the above given description, the essential ingredient elements in the permanent magnet obtained by the inventive method include a rare earth element or a combination of rare earth elements, iron which may be partially replaced with cobalt and boron.

The rare earth element denoted by R is selected from the group consisting of yttrium and the elements having an atomic number of 57 through 71, of which neodymium and praseodymium are preferred. Substitution of terbium or dysprosium for a part of neodymium or praseodymium has an effect of increasing the coercive force of the magnet prepared by the inventive method.

The second essential constituent of the magnet is iron, which can be partially replaced with cobalt. The molar content of iron or iron plus cobalt is at least 82% to exceed the molar content of iron in the magnetically hard $R_2Fe_{14}B$ phase enabling formation of the magnetically soft Fe or Fe/Co phase in the nanocomposite structure of the magnet. When a part of iron is replaced with cobalt, the amount of cobalt should be limited such that the molar proportion of cobalt to the total amount of iron and cobalt does not exceed 20% because a decrease is caused in the magnetic properties of the magnetically hard phase when the content of cobalt is too high.

Further, it is optional that a part of iron or iron/cobalt is substituted by a small amount of one or more of additive elements, generically denoted by M, selected from the group consisting of aluminum, vanadium, molybdenum, zirconium, titanium, tin, copper and gallium. Addition of the additives M has an effect to obtain a finer texture of the nanocomposite structure contributing to an improvement in the coercive force of the magnet. It is, however, desirable that the total amount of these additive elements M does not exceed 4% by moles because, when the amount thereof is too large, a decrease is caused in the magnetic properties of the magnet. The amount of these additive elements M in the magnet is preferably in the range from 0.1 to 4% by moles in consideration of the benefit thereby on the coercive force of the magnet.

Besides the above mentioned constituent elements of the magnet including rare earths, iron, cobalt, boron and the additive elements M, it is almost always the case that the magnet alloy contains a variety of impurity elements including carbon, oxygen and others brought in as contained in the starting base materials for the preparation of the magnet alloy or entering the alloy in the course of processing. The amount of these unavoidable impurity elements should be controlled as small as possible but it is a very difficult matter to decrease the amount thereof not to exceed 1% by weight.

The magnet material to be subjected to processing according to the inventive method is a quenched thin ribbon of the alloy which can be prepared by the liquid quenching method or mechanical alloying method known per se in the form of a thin ribbon as such or sometimes in the form of a powder, also generally referred to as the quenched thin ribbon here, from the magnet alloy of the above described composition. The quenched thin ribbon may have either a structure of a very fine texture of 10 nm order in which the grains are under magnetic exchange coupling or an amorphous structure. Although the method of the present invention is applicable irrespective of the texture of the alloy structure, it is preferable that the inventive method is applied to a magnet alloy in an amorphous state in order to prevent growth of the magnet alloy grains in the course of the uniaxial hot-deformation treatment as far as possible.

While the R/Fe/B-based permanent magnet according to the present invention is obtained by subjecting a quenched thin ribbon of the magnet alloy as such to a uniaxial hot-deformation treatment to impart magnetic anisotropy to the ribbon, it is the prior art that the uniaxial hot-deformation treatment is undertaken not for a quenched thin ribbon as such but for a magnetically isotropic magnet block in a bulky form prepared from quenched thin ribbons by using a hot press. To the contrary, the uniaxial hot-deformation treatment according to the inventive method is undertaken after rapidly heating the quenched thin ribbon up to the elevated temperature of the treatment so that the quenched thin ribbon in the course of imparting magnetic anisotropy receives only a necessary minimum thermal effect to suppress undue coarsening of the fine structure by the uniaxial hot-deformation treatment consequently to ensure full magnetic exchange coupling between magnet alloy grains.

A rare earth/iron/boron-based magnet alloy of which the content of iron is at least 82% by moles and the magnetically hard phase is the $R_2Fe_{14}B$ phase is not susceptible to deformation and can hardly be imparted with magnetic anisotropy even when it is subjected to a uniaxial hot-rolling treatment. In order to solve this problem, the R/Fe/B-based magnet alloy used in the inventive method is prepared in such a way that the molar content of iron is at least 82% and a liquid phase is found in the course of the uniaxial hot-deformation treatment. This liquid phase is required to have affinity to and exhibit wettability on the solid phase of the R/Fe/B-based magnet alloy because, if the liquid phase is provided from an alloy exhibiting absolutely no wettability on the R/Fe/B-based alloy, such as a solder alloy of low melting point, having no relevance in nature to the rare earth-based magnet alloy, no contribution can be expected for the liquid phase to the uniaxial hot-deformation treatment to impart magnetic anisotropy. Detailed experimental studies undertaken by the inventors have led to a finding that the liquid phase is provided preferably by a lanthanum/iron-based alloy or a rare earth/copper-based alloy. Lanthanum and copper metals can be directly introduced into the alloy composition or, alternatively, introduced in the form of a lanthanum/iron alloy and in the form of a rare earth/copper alloy, e.g., samarium/copper alloy, into a $R_2Fe_{14}B$-based alloy. It is preferable that the R/Fe/B-based alloy is admixed with lanthanum or copper. No intermetallic compounds are formed in a lanthanum/iron-based binary alloy and the $La_2Fe_{14}B$ phase is hardly formed from a lanthanum/iron/boron-based ternary alloy. It is known that a lanthanum/iron-based binary alloy of a high lanthanum content is converted into a liquid phase at 800° C. or higher by undergoing a eutectic reaction. Having similarity to the R/Fe/B-based magnet alloy as the base, the liquid phase thus formed can exhibit good wettability on the $R_2Fe_{14}B$ phase to contribute to the uniaxial hot-deformation.

As to the rare earth/copper-based alloy as the source to supply the liquid phase, on the other hand, copper does not serve as a substituting element for iron in the $R_2Fe_{14}B$ phase and the compounds formed from copper and a rare earth element have a low melting point so that the rare earth/copper-based alloys are suitable as the source material for the formation of a liquid phase to contribute to the uniaxial hot-deformation.

Thus, it is the most characteristic feature of the inventive method that the uniaxial hot-deformation treatment is conducted in the presence of a liquid phase formed from a low melting-point alloy so that re-orientation of the magnetically hard phase is promoted by the liquid phase so as to ensure magnetic anisotropy imparted to the magnet which can hardly be accomplished in the prior art.

After imparting full magnetic anisotropy to the quenched thin ribbons by thoroughly conducting rolling for deformation proceeding via a liquid phase mentioned above in the uniaxial hot-deformation treatment, the liquid phase formed from a lanthanum/iron-based or rare earth/copper-based alloy of a low melting point is squeezed out of the quenched thin ribbon so that the marginal portions thereof, which are not under a compressive force by rolling, are enriched with the liquid phase and the center portion thereof becomes substantially free from the liquid phase.

When, as in the prior art method, the uniaxial hot-deformation treatment for imparting magnetic anisotropy is undertaken for a magnetically isotropic bulk magnet prepared from the magnet alloy, the liquid phase of a low melting-point alloy is not squeezed out toward the marginal portions of the magnet body but is distributed uniformly throughout. Namely, the phenomenon of enrichment of the marginal portions with the liquid phase is unique only in the inventive method in which quenched thin ribbons are subjected as such to the uniaxial hot-deformation treatment. Being non-magnetic, the low melting-point phase forming the liquid phase has no contribution to the magnetic properties of the hot-deformed magnet but is rather detrimental. Accordingly, it is usual that only the center portion, which is formed substantially entirely of magnetic phases, of the hot-deformed magnet body is utilized as a magnetically anisotropic nanocomposite permanent magnet after removing the marginal portions which are magnetically inferior due to the high content of the non-magnetic low melting point phase.

It is important in the uniaxial hot-deformation treatment to ensure quickness of the treatment to be completed within a short time in order to avoid undue growth of the magnet grains. In this regard, for example, the time taken for temperature elevation from room temperature to the holding temperature or, in particular, from 500 to 1000° C. for the uniaxial hot-deformation treatment is desirably from 2 to 300 seconds and the time taken for decreasing the temperature from the holding time to a temperature of 300° C. or lower is preferably from 5 to 600 seconds.

The above mentioned quickness of the treatment relative to the temperature elevation and temperature decrease can be accomplished by undertaking the treatment, for example, by the so-called "current-carrying powder rolling method", of which the principle is shown by a schematic illustration of FIG. 1 for a cross sectional view of the apparatus system in a direction perpendicular to the axes of the rollers. In this method. A pair of rollers 3A, 3B are held horizontally at the same height with their rotating axes in parallel each with the other making a narrow roller gap G therebetween. A powder 1 of a magnetic alloy prepared by mechanical pulverization of quenched thin ribbons is stacked within a hopper 2 installed on the rollers 3A, 3B so as to allow falling of the alloy powder 1 through the roller gap G between the rollers 3A, 3B rotating each in the direction indicated by the arrow. The rollers 3A, 3B are each connected to the terminal of an electric power source 5 which enables passing of a large electric current through the layer of the alloy powder 1 held in the roller gap G so as to heat the layer of the alloy 1 up to the highest of the treatment temperature during staying of the powder 1 in the roller gap G between the rollers 3A, 3B which are urged each at the other to compress the layer of the alloy powder 1 by applying a force indicated by the arrows P in the horizontal direction thus converting the alloy powder into a uniaxially hot-deformed magnet sheet 4 as the rollers 3A, 3B are rotated. In this case, uniaxial deformation of the powder layer is realized since the compressive force P on the powder layer is released in the horizontal direction in parallel to the roller axes and is limited only to the vertical direction.

Since the alloy powder 1 forms a loose assembly until the powder 1 is compressed in the roller gap G, the resistance heating of the alloy powder is little effective on the alloy powder 1 before entering the roller gap G so that temperature elevation of the alloy powder starts only after entering the roller gap G. On the other hand, the effect of resistance heating on the powder layer is ceased as the magnet sheet 4 comes out of the roller gap G thus to ensure a very short time for the effective resistance heating of the powder 1 of the quenched thin ribbons of the magnetic alloy.

According to this current-carrying powder rolling method, a magnetically anisotropic permanent magnet having a nanocomposite structure of 10 nm order fineness is obtained in the bulky form of a sheet 4 without substantial grain growth of the magnet alloy which otherwise is unavoidable in the course of conversion of an amorphous or microcrystalline state into a crystallized structure.

The highest temperature and the rates of temperature elevation and temperature decrease in the above described treatment can be determined by adequately selecting the velocity of roller revolution and the electric current passing between the rollers 3A,3B while the degree of compressive deformation can be optimized by adequately selecting the roller gap G and the compressive force P between the rollers 3A,3B. It is desirable that this treatment process is conducted in an atmosphere of vacuum or a non-oxidizing gas in order to prevent degradation of the alloy powder 1 and the hot-deformed magnet sheet 4 by oxidation at an elevated temperature. It is of course optional that the roller system illustrated in FIG. 1 is followed by another pair of or a sequence of pairs of rollers by which the hot-deformed magnet sheet 4 is subjected to a further uniaxial hot-deformation treatment.

Needless to say, the method for accomplishing uniaxial hot-deformation of quenched thin ribbons of the magnet alloy is not limited to the above described current-carrying powder rolling method and various other methods, such as the compression discharge sintering method and the like, can be applied, provided that the method works in substantially the same way as in the current-carrying powder rolling method.

In the following, the method of the present invention is described in more detail by way of Examples, which, however, never limit the scope of the invention in any way.

EXAMPLE 1.

A melt of a magnet alloy consisting of 8% by moles of neodymium, 1% by moles of lanthanum, 76% by moles of iron, 10% by moles of cobalt and 5% by moles of boron, plus trace amounts of unavoidable impurity elements, was converted into quenched thin ribbons of amorphous structure by a method of liquid quenching using a single-roller apparatus with a roller rotating at a peripheral velocity of 60 meters/second in an argon atmosphere of a reduced pressure.

The amorphous quenched thin ribbons were mechanically pulverized into a powder of fineness to pass a 100 mesh screen. The thus obtained magnet alloy powder was converted into a uniaxially hot-deformed permanent magnet in a bulky form of a sheet of continuous length having a width of 20 mm and a thickness of 1 mm by the current-carrying powder rolling method using an apparatus system similar to that illustrated in FIG. 1. The operating conditions here included: 500 kg/cm$^2$ on an average of the uniaxial rolling pressure, 10 kA of the electric current between rollers 3A,3B, 1 mm/second of the peripheral velocity of the rotating rollers 3A,3B, about 20 seconds of time taken for temperature elevation up to the hot-deformation temperature of, for example, 800° C. and about 40 seconds taken for temperature decrease therefrom down to 300° C.

After removal of 2.5 mm wide lanthanul-enriched marginal portions at both sides of the 20 mm wide magnet sheet 4 obtained in the above described manner, the 15 mm wide magnet sheet was subjected to the measurement of the magnetic properties in the length-wise direction of the sheet to find that the residual magnetic flux density Br was 1.66T and the coercive force iHc was 800 kA/m supporting uniaxial magnetic anisotropy of the magnet.

Chemical analysis of the magnet sheet indicated that the 15 mm wide center portion of the magnet sheet 4 consisted of 8.1% by moles of neodymium, 0.1% by moles of lanthanum, 76.5% by moles of iron, 10.1% by moles of cobalt and 5.1% by moles of boron suggesting enrichment of lanthanum in the 2.5 mm wide marginal portions removed consisting of the phases of Fe and $Nd_2Fe_{14}B$.

EXAMPLE 2.

A quenched amorphous thin ribbon was prepared under the same conditions as in Example 1 from an alloy composition consisting of 6.0% by moles of praseodymium, 1.5% by moles of lanthanum, 87.5% by moles of iron and 5.0% by moles of boron excepting for unavoidable impurity elements. A continuous length bulk plate having a width of 20 mm and a thickness of 1 mm was prepared from the above prepared amorphous ribbon by the current-carrying powder rolling method under the same conditions also as in Example 1.

A 15 mm wide bulk plate obtained by removing 2.5 mm wide marginal portions consisting of the $Fe/Fe_{14}Nd_2B$ phases from the above obtained 20 mm wide bulk plate was subjected to the measurements of the magnetic properties to give the results of Br of 1.53T and iHc of 990 kA/m with magnetic anisotropy. This sample consisted of 6.5% by moles of praseodymium, 0.1% by moles of lanthanum, 88% by moles of iron and 5.4% by moles of boron indicating that most of the lanthanum was concentrated in the marginal portions.

EXAMPLE 3.

An alloy melt prepared from 95% by weight of a first alloy consisting of 8% by moles of neodymium, 82.5% by moles of iron, 8% by moles of boron, 1% by moles of aluminum and 0.5% by moles of titanium excepting for trace amounts of unavoidable impurity elements and 5% by weight of a second alloy which was an SmCu alloy was processed in the same manner as in Example 1 into quenched thin films of amorphous structure from which a continuous length sheet of a uniaxially hot-deformed permanent magnet was prepared also in the same manner as in Example 1.

Measurement of the magnetic properties in the length-wise direction of the center portion of the magnet sheet was undertaken for the sheet magnet to find that the residual magnetic flux density Br was 1.45T and the coercive force iHc was 1250 kA/m supporting uniaxial magnetic anisotropy of the magnet.

The sheet magnet was manually ground into a powder having fineness to pass a 20 mesh screen, which was subjected to the X-ray diffractometric study to find that the principal crystalline phases constituting the powder included $Nd_2Fe_{14}B$ and $Fe_3B$.

EXAMPLE 4.

A continuous length magnetically anisotropic magnet sheet was prepared in just the same manner as in Example 1 except that the starting alloy melt consisted of 8% by moles of neodymium, 1% by moles of lanthanum, 76% by moles of iron, 5% by moles of boron, 1% by moles of copper and 0.5% by moles of molybdenum excepting for unavoidable impurity elements and the electric current between the rollers in the current-carrying powder rolling method was increased to 15 kA from 10 kA.

Measurement of the magnetic properties in the lengthwise direction of the magnet sheet was undertaken for the center portion of the sheet magnet to find that the residual magnetic flux density Br was 1.53T and the coercive force iHc was 1040 kA/m supporting uniaxial magnetic anisotropy of the magnet.

The sheet magnet was manually ground into a powder having fineness to pass a 20 mesh screen, which was subjected to the X-ray diffractometric study to find that the principal crystalline phases constituting the powder included $Nd_2Fe_{14}B$ and $Fe_3B$.

What is claimed is:

1. A method for the preparation of a magnetically anisotropic rare earth-based permanent magnet having a composition comprising a rare earth element, iron and boron, of which the content of iron is at least 82% by moles, and having a nanocomposite structure of which the magnetically hard phase is $R_2Fe_4B$, in which R is a rare earth element, and the magnetically soft phase is Fe or $Fe_3B$, which comprises the steps of:

(a) heating a quenched thin ribbon of a rare earth-based alloy having a composition comprising a rare earth element or a combination of rare earth elements, iron or a combination of iron and cobalt and boron, of which the content of iron or the combination of iron and cobalt is at least 82% by moles, at a temperature allowing partial formation of a liquid phase; and (b) subjecting the quenched thin ribbon of a rare earth-based alloy under heating to a uniaxial hot-deformation treatment under a compressive force.

2. The method for the preparation of a magnetically anisotropic rare earth-based permanent magnet as claimed in claim 1 in which at least a part of the rare earth element or combination of rare earth elements is lanthanum.

3. The method for the preparation of a magnetically anisotropic rare earth-based permanent magnet as claimed in claim 1 in which the content of cobalt in the combination of iron and cobalt does not exceed 20% by moles.

4. The method for the preparation of a magnetically anisotropic rare earth-based permanent magnet as claimed in claim 1 in which iron or the combination of iron and cobalt in the quenched thin ribbon is substituted by an additive element or a combination of additive elements selected from the group consisting of aluminum, vanadium, molybdenum, zirconium, titanium, strontium, copper and gallium in an amount not exceeding 4% by moles based on the overall amount of the composition.

5. The method for the preparation of a magnetically anisotropic rare earth-based permanent magnet as claimed in claim 4 in which at least a part of the additive elements is copper.

6. The method for the preparation of a magnetically anisotropic rare earth-based permanent magnet as claimed in claim 1 in which the uniaxial hot-deformation treatment is conducted by increasing the temperature to a holding temperature of from 500 to 1000° C. for a length of time in the range from 2 seconds to 5 minutes and by decreasing the temperature from said holding temperature to 300° C. or below for a length of time in the range from 5 seconds to 10 minutes.

7. A method for the preparation of a magnetically anisotropic rare earth-based permanent magnet having a composition comprising a rare earth element, iron and boron, of which the content of iron is at least 82% by moles, and having a nanocomposite structure of which the magnetically hard phase is $R_2Fe_4B$, in which R is a rare earth element, and the magnetically soft phase is Fe or $Fe_3B$, which comprises the steps of:

(a) heating a quenched thin ribbon of a rare earth-based alloy having a composition comprising a rare earth element or a combination of rare earth elements, iron or a combination of iron and cobalt and boron, of which the content of iron or the combination of iron and cobalt is at least 82% by moles, at a temperature allowing partial formation of a liquid phase; and (b) subjecting the quenched thin ribbon of a rare earth-based alloy under heating to a uniaxial hot-deformation treatment under a compressive force in which the uniaxial hot-deformation treatment of the quenched thin ribbon is conducted by a method of current-carrying powder-pressing in which a powder of the quenched thin ribbon is passed through a gap between a pair of rollers under compression forming a layer of the powder with an electric current passing through the layer of the powder to effect resistance heating of the powder layer.

\* \* \* \* \*

UNITED STATES PATENT AND TRADEMARK OFFICE
CERTIFICATE OF CORRECTION

PATENT NO. : 6,319,334 B1  Page 1 of 1
DATED : November 20, 2001
INVENTOR(S) : Ohashi et al.

It is certified that error appears in the above-identified patent and that said Letters Patent is hereby corrected as shown below:

Column 9,
Line 25, change "$R_2Fe_4B$" to -- $R_2Fe_{14}B$ --.

Column 10,
Line 25, change "$R_2Fe_4B$" to -- $R_2Fe_{14}B$ --.

Signed and Sealed this

Twenty-second Day of October, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,319,334 B1
DATED : November 20, 2001
INVENTOR(S) : Ohashi et al.

It is certified that error appears in the above-identified patent and that said Letters Patent is hereby corrected as shown below:

Column 9,
Line 25, change "$R_2Fe_4B$" to -- $R_2Fe_{14}B$ --.

Column 10,
Line 25, change "$R_2Fe_4B$" to -- $R_2Fe_{14}B$ --.

Signed and Sealed this

Twenty-ninth Day of October, 2002

Attest:

Attesting Officer

JAMES E. ROGAN
*Director of the United States Patent and Trademark Office*